July 13, 1926. 1,592,575
S. M. STONE
SPARE TIRE CARRIER FOR AUTOMOBILES
Filed April 2, 1923  2 Sheets-Sheet 1

Inventor:
Samuel M. Stone
by Arthur W. Nelson
Atty.

July 13, 1926.
S. M. STONE
1,592,575
SPARE TIRE CARRIER FOR AUTOMOBILES
Filed April 2, 1923　　2 Sheets-Sheet 2
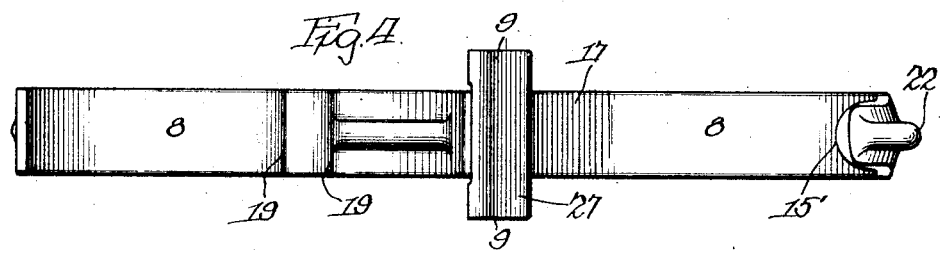
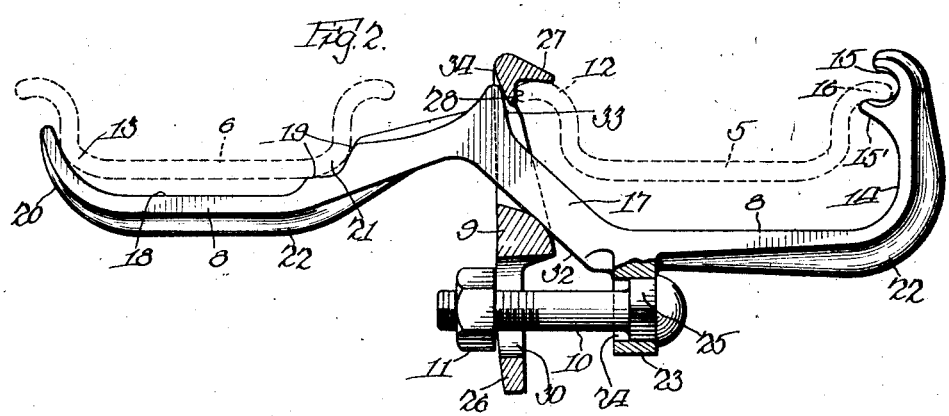
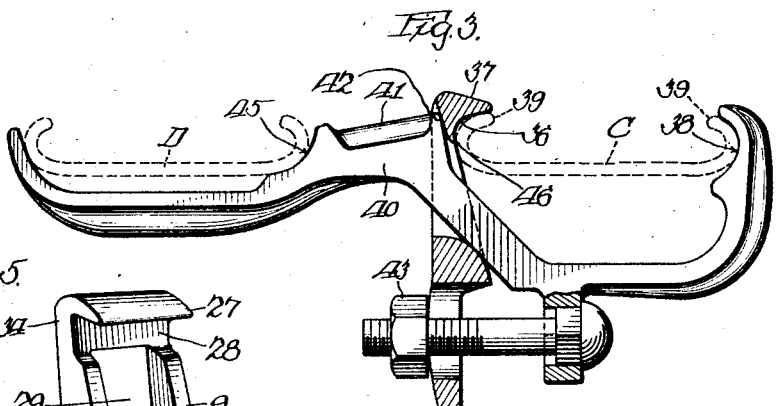
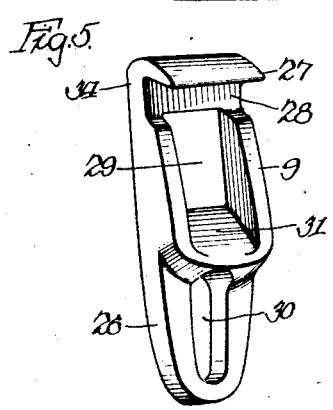
Inventor:
Samuel M. Stone Patented July 13, 1926.

1,592,575

UNITED STATES PATENT OFFICE.

SAMUEL M. STONE, OF CHICAGO, ILLINOIS.

SPARE-TIRE CARRIER FOR AUTOMOBILES.

Application filed April 2, 1923. Serial No. 629,309.

This invention relates to extra spare tire carriers for automobiles.

The object of the invention is to provide simple, durable and easily operable means for increasing the capacity of any ordinary spare tire carrier by one or more tires. That is to say; if attached to the rim carried by an ordinary carrier the device to be described will accommodate one or more additional tires.

The device as usually constructed is adapted to receive units of one additional demountable rim and to hold it securely. The use of ropes, straps, or other makeshifts are entirely unnecessary.

The use of a wrench, pliers or the like is all that is required for attaching the carrier to the rim of a spare tire, and for releasing the extra spare tire therefrom.

The invention consists in a device of the form, construction, combination and arrangement of parts whereby the above named objects, together with others that will appear hereinafter are attainable, and my invention will be more readily understood by reference to the accompanying drawings which illustrate what I consider, at the present time to be the preferred embodiment thereof.

In said drawings:—

Fig. 2 is an assembly view of one of the three units as constructed for "straight side" rims, certain of the parts being shown in section better to disclose the construction and operation thereof.

Fig. 3 is a similar view of one unit as adapted for "clincher" rims.

Fig. 4 is a plan view projected from Fig. 2; and

Fig. 5 is a detail perspective view of the clamp or part 9.

Figure 1:
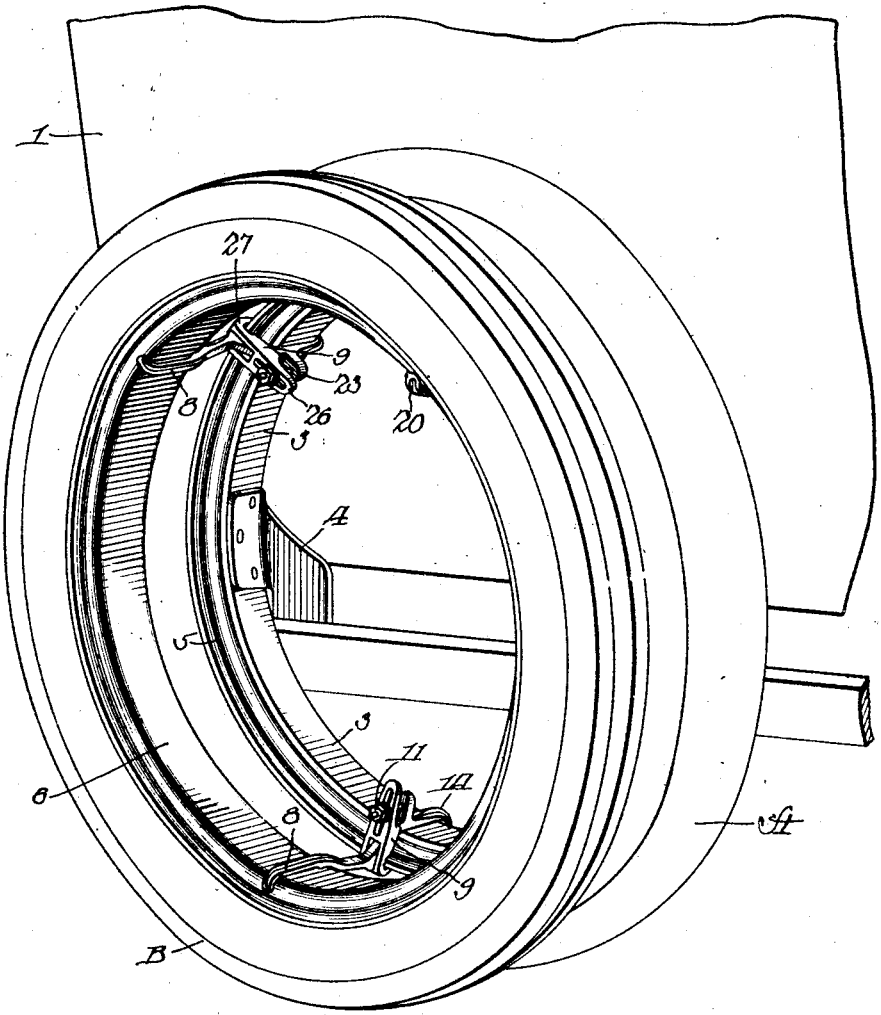
Fig. 1 is a perspective view of an ordinary spare tire equipment at the rear of a motor car, together with an extra spare tire as carried by a set of devices embodying the invention.

Referring first to Fig. 1; numeral 1 denotes the rear end of an automobile body, equipped with a spare tire carrier, of known construction comprising an annular band 3 and supporting brackets as 4. The regular spare tire, marked A, is assumed to be fastened to carrier element 3 in any usual manner, (this detail not being relevant to the invention) by engagement with its rim 5. The extra spare tire, B, with its rim 6, is shown as supported in close proximity to spare tire A, by means to be described.

Referring next to Fig. 2 the dotted section 5 represents a radial section of the rim of a spare tire A shown in Fig. 1, and the dotted section 6, represents a radial section of the rim of the extra spare tire B shown in Fig. 1. These sections are for "straight side" tires, which are used upon all the larger sizes of automobiles.

The carrier unit consists of a tension arm 8—17, a clamp 9, and a bolt 10, with its nut 11. The tension arm comprises, at its extreme ends, means for engaging one flange of spare rim 5 and means for engaging the outer base portion 13 of spare rim 6. Specifically, the inner end of the arm 8 has an outwardly projected finger 14, in the end of which is an inwardly opening notch 15, which receives the rim flange 16. The intermediate portion 17 of said arm is bent obliquely outward. The outer half of the tension arm 8 has a concave rim-receiving face 18, a pair of shoulders 19, and an outwardly curved end 20, the word "outwardly" here meaning radially outward from the center of the rim 6. The said shoulders 19 are so located as to form bearings for the inner shoulder 21 of rim 6, as shown.

The tension arm as here shown is provided with stiffening ribs 22, on the radially inner face thereof.

Cast on the radially inner face of portion 8 is a lug 23, in which is a square-hole 24, in which is fitted the square shank 25 of a bolt 10, including a hexagon nut 11 of the size standard for the lugs or wedges of demountable rims.

The device is completed by a clamp member 9, which consists of a slotted body 29, a slotted tail 26, and a rim-hook 27 formed on the end of said body opposite said tail. The rectangular slot 29 receives, loosely, the portion 17 of arm 8—8. The narrow slot 30 has a loose fit upon the bolt 10. The hook 27 is adapted to fit over the outer rim flange 12 as is best shown in Fig. 2.

The inner narrow wall 31 of the slot 29, presents an inclined convex surface to the contacting inclined face 32 of part 17. This face 32 is in fact a wedge face, and when the tail 26 and lug 23 are drawn together by tightening the nut 11, this face rides outwardly upon the convex surface 31, thereby tilting the whole arm 8—8 radially outward: the point of lug 15' being the fulcrum of this movement.

To apply the carrier to the first spare rim: 1st—Engage each unit with said rim (5) in the manner shown in Fig. 2, leaving the nuts 11 far enough out on the bolts to permit the extra spare rim (6) to be passed over the three curved ends 20 of the tension arms. Place one unit at the bottom, as indicated on Fig. 1, and space the other two units equally. 2nd—Place the tire, B, and its rim, 6 over the arms 8; the tire will now hang from the upper two arms. 3rd—With a rim wrench, run up each nut 11 until each of the arms bears with firm pressure upon the rim 6. Rim 6, with its tire, is now locked in position by the three outwardly curved ends 20, and as each arm 8 is tightly jammed against this extra rim, no rattling or other undesired movement can occur. The rims can, obviously, be quickly and easily demounted when necessary.

Referring to Fig. 4, C and D represent sections of clincher rims, the one at the right being supposedly the regular spare, and the one at the left being the extra spare, rim. My carrier as adapted for rims of this sectional form embodies suitable variations from the construction disclosed in Fig. 2.

The concavity 36 of the hook 37 is more rounded. The radius of curvature of the notch 38 is longer. Thus the rim flanges 39 are properly engaged. The portion 40 of the tension arm is relatively heavier, and the rib 41 thereon is less inclined from horizontal. At the outer end of this rib, is formed a projection 42. When the nut 43 is nearly off the bolt, the clamp 37 could ride over said rib 41 and its upper end could lodge in the concave portion 45, were this movement not stopped by the impingement of the edge 46 upon said projection 42. The mode of operation of this form of the device is exactly the same as has been described for the straight-side rim type.

I have now described preferred constructions of the device, but it is to be understood that many modifications of form, shape, arrangement and combination of parts are contemplated by me as within the scope of the appended claims.

I claim:—

1. A tension arm comprising a concaved arm for an extra spare tire rim, an oblique intermediate portion 17, an opposed arm having a bent portion 14, a recess 15, in the end of said bent portion, and a shoulder 33 facing said recess at one end of said intermediate portion, in combination with a clamp member having a slot through which said intermediate portion extends, an inclined surface of said member being contacted by said shoulder 33, and means for changing the angle between the clamp member and the tension arm.

2. In combination, a clamp member having a slot and a lip 46; a tension arm extending through said slot, a projection 42 on said arm, as a stop for said lip, and a bolt loosely connecting the arm to the clamp member.

3. A spare tire carrier comprising an arm member having a fulcrum engagement at one end with one side flange of a spare tire rim and being of a length adapted to receive and support a second spare tire rim on its outer end, a clamping member positioned between said rims, one of said members extending through the other member, said clamping member including a part at one end to engage the other side flange of said first spare tire rim, a bolt positioned substantially horizontally in said arm member and extending through the other end of the clamping member, and a nut on said bolt for drawing up on said clamping member and thereby causing said arm member to swing radially outward about its fulcrum engagement with the first mentioned side flange of the first spare tire rim to tightly engage said second spare tire rim.

4. A spare tire carrier comprising an arm member having a fulcrum engagement at one end with one side flange of a spare tire rim and being of a length adapted to receive and support a second spare tire rim on its other end, a clamping member positioned between said rims, one of said members extending through the other member, said clamping member provided at one end with a part to engage the other side flange of said first spare tire rim and provided near its other end with an opening, an apertured lug connected to the arm member, a bolt extending substantially horizontally from said lug in the same general direction as the arm member and passing through said opening in the clamping member, and a nut on said bolt for drawing up on said clamping member and thereby causing said arm member to swing radially outward about its fulcrum engagement with its first mentioned side flange of the first spare tire rim to tightly engage said second spare tire rim.

5. A spare tire carrier comprising an arm having a fulcrum engagement at one end with one side flange of a spare tire rim and being of a length adapted to receive and support a second spare tire rim on its other end, a member positioned between said rims and through which the arm extends, said member including a part at one end to engage the other side flange of said first spare tire rim, a bolt non-rotatively positioned in said arm and extending through the other end of said member and a nut on said bolt for drawing up on said member and thereby causing said arm to swing radially outward about its fulcrum engagement with the first mentioned side flange of the first spare tire rim to tightly engage said second spare tire rim.

6. A spare tire carrier comprising an arm having a fulcrum engagement at one end with one side flange of a spare tire rim and being of a length adapted to receive and support a second spare tire rim on its other end, said two ends of said arms being connected by an angularly disposed central portion, a member having an opening between its ends and through which said angularly disposed central portion of said arm extends, said member including a hook flange on one side of the opening to engage the other side flange of the first mentioned spare tire rim, and a slotted tail on the other side of said opening, a bolt carried by said arm and extending through the slotted tail of said member and a nut on said bolt to draw up on the tail end of said member.

In testimony whereof, I have hereunto set my hand, this 27th day of March, 1923.

SAMUEL M. STONE.